United States Patent [19]

Tezuka

[11] Patent Number: 4,614,984
[45] Date of Patent: Sep. 30, 1986

[54] RECORDING AND/OR REPRODUCING APPARATUS WITH ARRANGEMENT FOR POSITIONING RESETTING THE HEAD

[75] Inventor: Nobuo Tezuka, Kanagawa, Japan

[73] Assignee: Canon Kabushiki Kaisha, Tokyo, Japan

[21] Appl. No.: 513,164

[22] Filed: Jul. 13, 1983

[30] Foreign Application Priority Data

Jul. 16, 1982 [JP] Japan .................. 57-124262
Jul. 16, 1982 [JP] Japan .................. 57-124263

[51] Int. Cl.[4] .................. G11B 21/02; G11B 21/22; G11B 5/54
[52] U.S. Cl. .................. 360/75; 360/78; 360/105
[58] Field of Search .................. 360/75, 78, 132, 128, 360/135, 105; 369/77.2, 71

[56] References Cited

U.S. PATENT DOCUMENTS

| | | | |
|---|---|---|---|
| 3,733,592 | 5/1973 | Applequist | 360/78 |
| 3,881,734 | 5/1975 | Leedom | 369/71 |
| 3,959,823 | 5/1976 | Heidecker et al. | 360/99 |
| 3,973,272 | 8/1976 | Morgan et al. | 360/86 |
| 4,134,143 | 1/1979 | Ragle et al. | 360/99 X |
| 4,166,623 | 9/1979 | Nanbu et al. | 369/71 |
| 4,180,840 | 12/1979 | Allan | 360/128 |
| 4,380,781 | 4/1983 | Hirata | 360/99 X |
| 4,384,311 | 5/1983 | McNeil | 360/137 X |
| 4,408,315 | 10/1983 | Mehrota et al. | 369/71 |
| 4,466,032 | 8/1984 | Saito | 360/97 X |

FOREIGN PATENT DOCUMENTS

| | | |
|---|---|---|
| 2365095 | 7/1975 | Fed. Rep. of Germany . |
| 47-28934 | 11/1972 | Japan . |
| 56-134315 | 10/1981 | Japan . |
| 57-58223 | 4/1982 | Japan . |
| 83/01861 | 5/1983 | PCT Int'l Appl. .......... 360/75 |
| 0571925 | 10/1977 | U.S.S.R. .......... 360/75 |
| 0959153 | 9/1982 | U.S.S.R. .......... 360/75 |

Primary Examiner—Raymond F. Cardillo
Assistant Examiner—Alyssa H. Bowler
Attorney, Agent, or Firm—Toren, McGeady, Stanger, Goldberg & Kiel

[57] ABSTRACT

Disclosed is a recording and/or reproducing apparatus which includes movable recording and/or reproducing head apparatus, positioning apparatus for positioning the head apparatus at a selected position within a predetermined range for signal recording and/or reproducing, and reset apparatus for resetting the head apparatus at a predetermined position beyond the predetermined range.

19 Claims, 11 Drawing Figures

RECORDING AND/OR REPRODUCING APPARATUS WITH ARRANGEMENT FOR POSITIONING RESETTING THE HEAD

BACKGROUND OF THE INVENTION

1. Field of the Invention

This invention relates to a recording and/or reproducing apparatus and more particularly to a recording and/or reproducing apparatus using a rotary sheet or a rotary disc as the recording medium.

2. Description of the Prior Art

Heretofore there have been proposed various recording and/or reproducing apparatus of the type using a recording medium such as a rotary magnetic sheet or disc that is provided with recording tracks arranged spirally or concentrically with the rotating shaft thereof and having a recording or reproducing head which moves according to the recording tracks. In this type of apparatus, it is important to have the recording or reproducing head always accurately positioned opposite the recording track.

Furthermore, in this type of apparatus, a soiled surface due to dust or the like on the head, which is opposed to the recording medium, degrades the recording or reproducing characteristic of the apparatus. The adverse effect of such a soiled head surface is especially great in situations where the recording wave length is short and where a high relative speed between the head and the recording medium produces a so-called air film between them. Means are desired for accurately opposing the recording or reproducing head to a given recording track in resetting the head. Also, some means are desired for cleaning the head with a simple structural arrangement.

It is therefore a first object of the present invention to provide a recording and/or reproducing apparatus in which a recording or reproducing head can be accurately positioned relative to a corresponding recording track with simple structural arrangement and without necessitating fine, delicate adjustment.

It is a second object of the invention to provide a recording and/or reproducing apparatus which is not only capable of attaining the above object but is also capable of positioning a recording or reproducing head in relation to a recording track with virtually no adjustment required.

A third object of the invention is to provide a recording and/or reproducing apparatus which is capable of shifting a recording or reproducing head to a predetermined recording track position in association with a recording medium loading operation.

A fourth object of the invention is to provide a recording and/or reproducing apparatus which is not only capable of shifting a recording or reproducing head to the specific position relative to the recording medium in resetting the head with a simple structural arrangement but which also has cleaning means for cleaning the recording of reproducing heads.

SUMMARY OF THE INVENTION

To particularly attain the second object, a preferred embodiment of the invention includes a recording or reproducing head; feed means for feeding the recording or reproducing head; reset means for resetting the recording or reproducing head which has been fed by the feed means in a specific position which is different from predetermined signal recording track positions on a recording medium.

To attain the third object, another embodiment of the invention further includes the following in addition to the components employed in the above embodiment: Means for shifting the recording or reproducing head in response to the recording medium loading operation from the specific position, other than the above predetermined recording track positions, to a predetermined track position.

To attain the fourth object, a further embodiment of the invention includes reset means which brings the recording or reproducing head back to the specific position other than positions corresponding to a predetermined recording track of the recording medium; and cleaning means which cleans the recording or reproducing head, at least when the head is in the above specific position.

It is to be understood that the scope of the present invention is not limited by the specific embodiments which will be given hereinafter and that the invention may be modified and altered as desired without departing from the scope of the appended claims.

The above and further objects and features of the invention will become apparent from the following detailed description of preferred embodiments thereof taken in conjunction with the accompanying drawings.

DETAILED DESCRIPTION OF PREFERRED EMBODIMENTS

Figure 1:
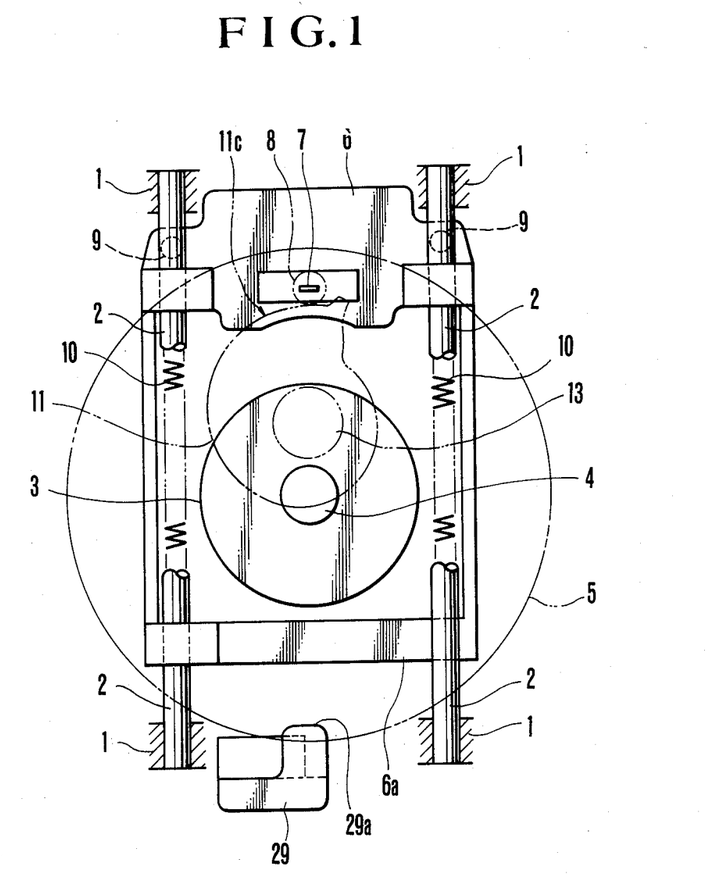
FIG. 1 is a plan view showing the upper portion of the shifting mechanism provided for shifting the position of a recording or reproducing head in a recording and/or reproducing apparatus embodying the present invention.
Figure 2:
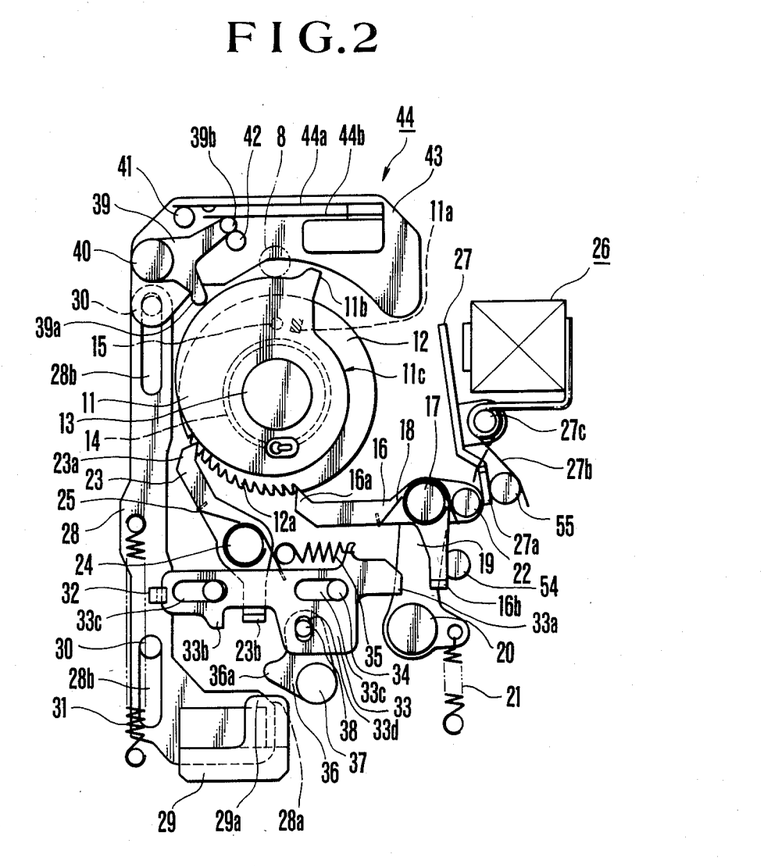
FIG. 2 is a plan view showing the lower portion of the same mechanism.
Figure 3:
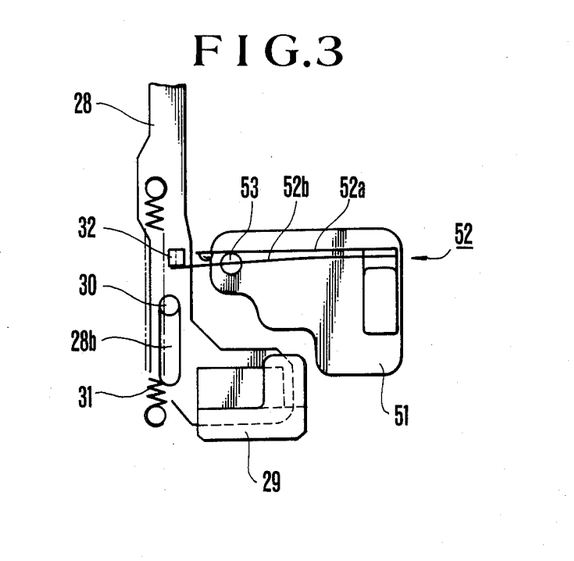
FIG. 3 is a plan view showing the details of an eject switch part included in the mechanism shown in FIGS. 1 and 2.

FIGS. 1 and 2 show a recording or reproducing head shifting mechanism employed in a recording and/or reproducing apparatus embodying the present invention. To make the illustration readily comprehensible, a head carrier part in the upper portion of the mechanism is shown in FIG. 1 while a control part included in the lower portion of the mechanism is shown in FIG. 2.

Referring to FIG. 1, the recording and/or reproducing apparatus is provided with a casing 1; guide rails 2 which are respectively carried by the casing 1 parallel with each other; a motor 3 which has a driving shaft 4; and a magnetic sheet 5 which is shown as a specific example of the recording medium and is rotatively driven by the motor 3 with recording tracks concentrically set thereon. The apparatus also includes a head carrier 6 which has a recording or reproducing head 7 mounted thereon and is movable along the guide rails 2; and a cam follower 8 which is provided on the head carrier 6 and which abuts a cam face 11c of a control cam 11. The head carrier 6 is urged downward, via pins 9 as viewed in FIG. 1, by the urging force of springs 10 which are between the head carrier 6 and the casing 1.

Referring to FIG. 2, the apparatus is further provided with a cam drive ring 12. The above control cam 11 and the cam drive ring 12 are respectively one unified body with a shaft 13 and are thus rotatable together. Along the outer circumference of the cam drive ring 12 is formed a ratchet 12a. A cam returning spring 14 is attached to the control cam 11 exerting a counterclockwise driving force thereon. A fixed stopper 15 abuts a protrusion 11a of the control cam 11 when the cam 11 returns to its original position. A drive pawl or claw 16 is pivotally carried by a shaft 17. A spring 18 is attached to the pawl 16 and produces an urging force turning the pawl 16 clockwise on the shaft 17. The tip 16a of the drive pawl 16 is capable of engaging the ratchet 12a of the cam drive ring 12 in the clockwise direction. A pawl driving lever 19 is pivotally carried by and rotatable on a shaft 20. A spring 21 exerts a clockwise urging force on the lever 19. The lever 19 has its position restricted by a stopper 54. The shaft 17 is disposed at one end of the pawl drive lever 19. A driving pin 22 is provided on the pawl drive lever 19 in the vicinity of the shaft 17. When an armature 27 is attracted by an excited electromagnet 26, the driving pin 22 receives an impact from one end 27a of the armature 27. A tangential force is then exerted on the cam drive ring 12 via the drive pawl 16. In other words, the driving pin 22 is set in a position to transmit the above driving force. Furthermore, the armature 27 is constantly urged to turn counterclockwise on a shaft 27c by a spring 27b while a stopper 55 defines the position of the armature 27. A control pawl or claw 23 receives the clockwise urging force of a spring 25 and thus turns clockwise on a shaft 24. One end 23a of the control pawl 23 engages the ratchet 12a of the outer circumference of the cam drive ring 12.

An eject lever 28 has an eject button 29 formed at one end of the unified body. The eject lever 28 is further provided with a slot 28b which is movably fitted on a shaft 30. The lever 28 is thus movable upward and downward, as viewed in FIG. 2, while a spring 31 normally keeps it in a lower position. A return lever 33 is provided with a slot 33c, which is movably fitted on a shaft 34, permitting the lever 33 to move to the left and right, as viewed in FIG. 2. Normally, however, the return lever 33 is kept at the left position by a spring 35, as shown in FIG. 2. The return lever 33 is further provided with two arms 33a and 33b which engage a raised part 16b provided at one end of the drive pawl 16 and a raised part 23b formed at one end of the control pawl 23 turning these pawls 16 and 23 counterclockwise when the return lever 33 moves to the right. With these pawls 16 and 23 thus turning, their ends 16a and 23a disengage the ratchet 12a of the cam drive ring 12. A bell crank 36 is rotatable on a shaft 37 and is provided with a pin 38 at one end thereof. The pin 38 is movably fitted in a slot 33d which is provided in the return lever 33. The other end 36a of the bell crank 36 contacts a slanting face part 28a of the eject lever 28. This contact causes the bell crank 36 to turn clockwise on the shaft 37. Clockwise turning of the bell crank 36 moves the return lever 33 to the right via the pin 38.

In taking out or loading the cassette which contains a magnetic sheet 5 therein, the eject button 29 is pushed upward, as viewed in FIGS. 1 and 2. One end 29a of the eject button 29 then abuts on a part 6a of the head carrier 6. The head carrier 6 is then moved upward charging the spring 10 which drives it. Furthermore, the slanting face part 28a of the eject lever 28 turns the bell crank 36 clockwise. As a result, the drive pawl 16 and the control pawl 23 disengage the ratchet 12a of the cam drive ring 12. Then, since the head carrier 6 moves, the control cam 11 and the cam drive ring 12 are brought back to their original positions by the urging force of the cam return spring 14. Furthermore, during the initial push-in operation on the eject button 29, an eject switch 52 is closed inhibiting recording or reproduction by the recording or reproducing head 7. The contact pieces 52a and 52b of the eject switch 52 are normally opened by a switch driving member 32 provided on the eject lever 28 until the lever 28 moves upward, as viewed in the drawing. The eject switch 52 is carried by a base plate 51 while the position of the contact piece 52a is defined by a pin 53.

When the eject button 29 is pushed nearly to the full extent thereof, the head carrier 6 and the recording or reproducing head 7, which is mounted thereon, return to their original positions. The return position of the recording or reproducing head 7 will be further described later herein with reference to FIGS. 6 and 7. Meanwhile, at the last stroke position of the eject button 29, a member which is not shown but is interlocked therewith opens a cassette containing part permitting unloading or loading of the cassette, as will be further described later with reference to FIG. 5. The arrangement described above may be replaced with another arrangement wherein the above interlocked relation is cut off discretely returning the recording or reproducing head 7, the cam drive ring 12 and the control cam 11 back to their original positions from opening or closing the cassette containing part; and the switch 52 is operated to inhibit recording or reproduction. Such an arrangement permits the operator to stop reproducing halfway on the recording track and to play it back again from the first track of the record.

Figure 4:
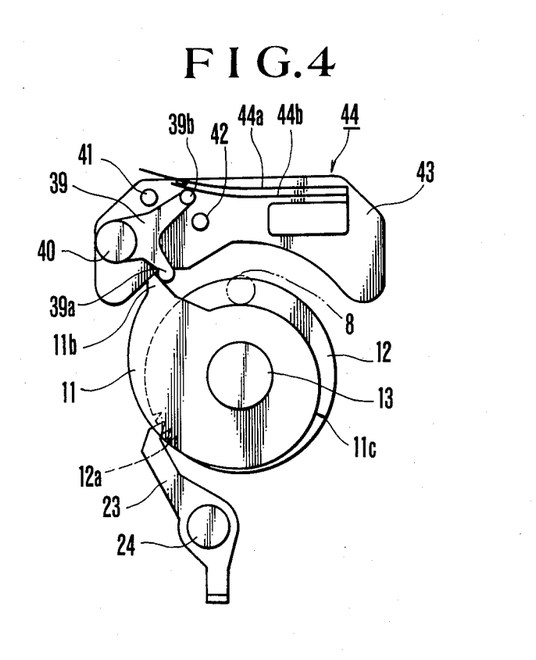
FIG. 4 is a plan view showing the operating condition of a last track switch included in the mechanism shown in FIGS. 1 and 2.

Referring now to FIG. 4, a reference numeral 44 identifies a last track switch. Contact pieces 44a and 44b of the switch 44 are open while the recording or reproducing head 7 is in positions other than the last track position thereof. These contact pieces of the switch 44 are closed cutting off current supplied to the electromagnet 26 when the head 7 is in the last track position. A switch drive lever 39 is pivotally carried by a shaft 40 turning thereon. One end 39b of the switch 39 is pushed by the contact piece 44b of the switch 44 and normally has a clockwise force exerted thereon. However, a stopper 42 keeps the switch drive lever 39 in its stand-by position, as shown in FIG. 2. When the control cam 11 turns to a position corresponding to the last track position, the protruding part 11b of the control cam 11 pushes one end 39a of the switch drive lever 39 turning the lever counterclockwise, as shown in FIG. 4. As a result, the contact pieces 44a and 44b of the switch 44 are closed. The position of the contact piece 44a of the switch 44 is defined by a pin 41. A base plate 43 is provided for the last track switch 44, the pin 41, the stopper 42 and the switch drive lever 39.

Figure 5:
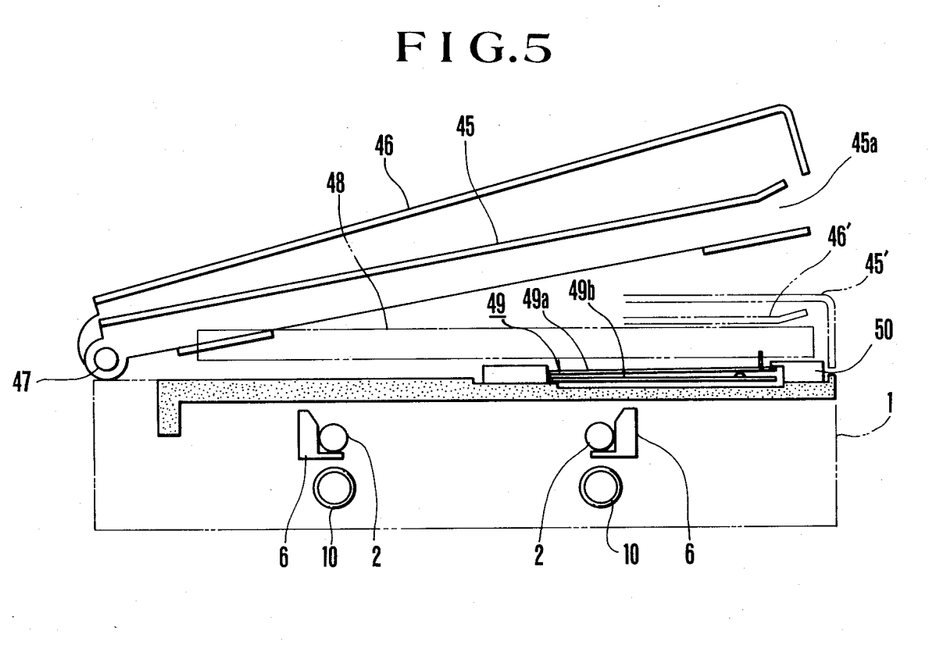
FIG. 5 is a sectional view schematically showing the casing and the cassette containing part of the recording or reproducing head shifting mechanism shown in FIGS. 1 and 2.

FIG. 5 is a side sectional view of the casing 1 including the cassette containing part of the recording and/or reproducing apparatus shown in FIGS. 1 and 2. In these drawings, the same members are identified by the same reference numerals. The casing 1 is provided with an inner lid 45. On the inner side of the inner lid 45 is formed a cassette containing part 45a. The casing 1 is further provided with an outer lid 46 and a hinge shaft 47. The inner and outer lids 45 and 46 are pivotally carried by the hinge shaft 47. With the eject button 29 pushed in to the full extent thereof, the inner and outer lids 45 and 46 are opened by means, which is not shown, indicated by full lines in such a way as to enable the operator to take out or load a cassette 48. A cassette loading switch 49 is provided on the casing 1. The loading switch 49 is provided with contact pieces 49a and 49b which are open when the apparatus is not loaded with the cassette 48. A member 50 defines the positions of these contact pieces 49a and 49b. When the cassette 48 which contains the magnetic sheet 5 is placed in the cassette containing part 45a and when the inner and outer lids 45 and 46 are set in their operating positions 45' and 46' on the casing 1, the contact piece 49a is pushed by the lower face of the cassette 48 and the contact pieces 49a and 49b are closed. The cassette loading switch 49 thus closes when the cassette 48 is completely loaded. This arrangement for closing the switch 49 may be replaced with another arrangement wherein, with the cassette 48 set in the normal loading position, the switch 49 is closed by a part of either the inner lid 45 or the outer lid 46 instead of by the lower face of the cassette 48.

In the apparatus which is arranged as described above, the recording or reproducing head is fed in the following manner: When the electromagnet 26 is excited, this causes the drive pawl 16 to turn the cam drive ring 12 clockwise via the armature 27. In this instance, the turning or rotating extent l is arranged to be $P < l < 2P$, wherein P represents a turning extent corresponding to one pitch of the ratchet 12a. Assuming that the turning force of the head carrier driving spring 10 applied to the control cam 11 is f1 and the counterclockwise turning force of the cam return spring 14 f2, the relation between the two forces is $f1 < f2$. As a result of this arrangement, the control pawl 23 turns the control cam 11 stepwise to the extent of P each time. In other words, the cam 11 is turned to the extent of P at a time for one track pitch. The recording or reproducing head 7 thus moves stepwise with the cam lift of the control cam 11 decreased by one track pitch each time. By virtue of this arrangement, a turning force $f2 - f1$ suffices for the control cam 11. The control cam 11 can thus be driven with a small driving force. This permits size reduction of the electromagnet 26 and thus results in less power consumption. Meanwhile, the head carrier 6, which has a relatively large inertia including the recording or reproducing head 7, is driven by the elastic force of the spring 10. This ensures a good response. The switch 44 terminates the excitation of the electromagnet 26 when the recording or reproducing head 7 reaches the last track.

When the ratchet 12a of the cam drive ring 12 is disengaged from the control pawl 23 and the drive pawl 16 as a result of the ejecting operation mentioned in the foregoing, the urging force of the spring 14 turns the control cam 11 and the cam drive ring 12 counterclockwise until they arrive at a position where the protruding part 11a of the control cam 11 abuts the stopper 15. At that point, the control cam 11 and the cam drive ring 12 assume their initial phase.

Figure 6:
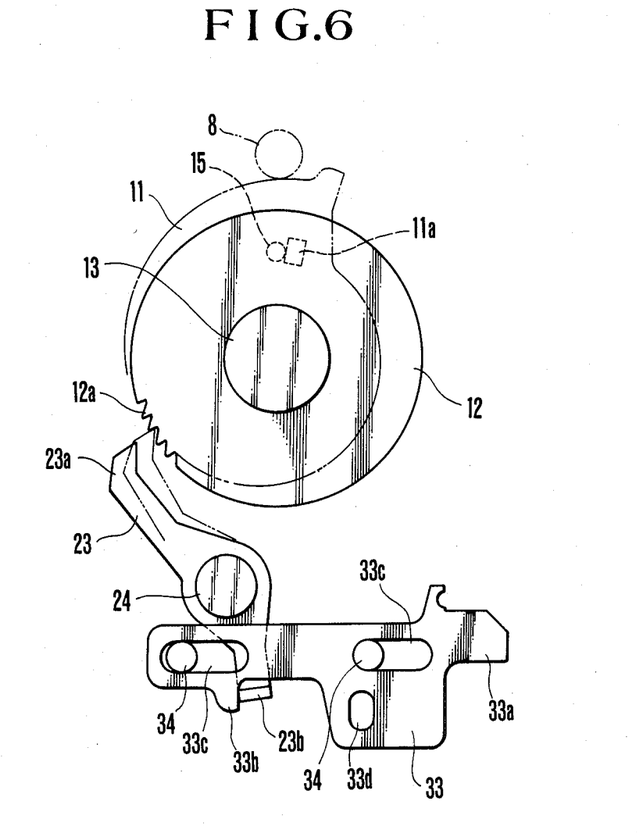
FIGS. 6 and 7 show the initial phase of a control cam arranged in the mechanism shown in FIGS. 1 and 2.

If this initial phase is adjusted to a cam phase corresponding to the first track position of the magnetic sheet 5, the ratchet 12a of the cam drive ring 12 tends to inadequately engage one end 23a of the control pawl 23, as shown in FIG. 6. This is because the phase of the cam 11 is determined by engagement between the pawl 23 and the ratchet 12a. This inconvenience might be avoided by forming the stopper 15 with an eccentric screw or the like for effecting fine adjustment. However, such adjustment is not easy. Besides, the cam 11 lift corresponding to the first track of the magnetic sheet 5 must also be taken into consideration. Such an adjusting arrangement is therefore difficult for practical application. As an alternative, it is also conceivable to omit one ratchet tooth of the ratchet 12a which the control pawl 23 should engage at the first track position of the head 7. However, in some cases, no part of the ratchet 12a is omissible due to the number of tracks and/or due to a phase relation between the drive pawl 16 and the control pawl 23.

Figure 7:
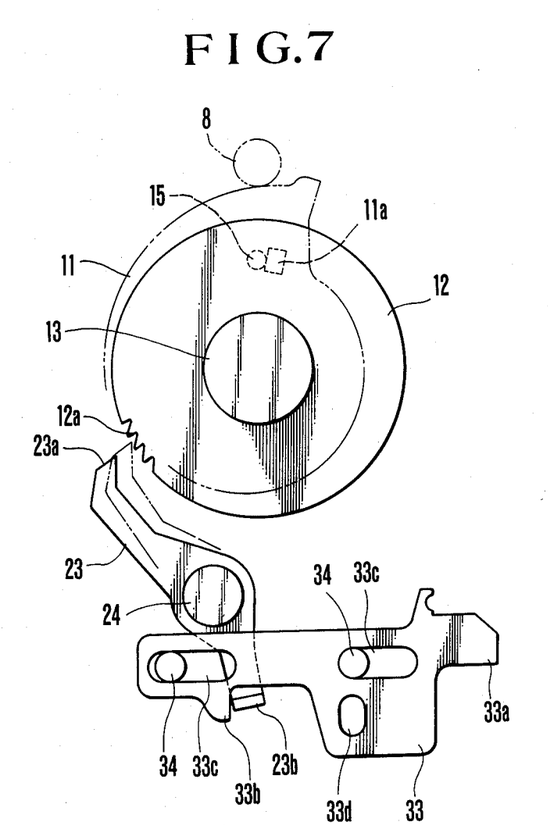

In view of these difficulties, the initial phase of the control cam 11, in this specific embodiment of the invention, is determined jointly by the protruding part 11a and the stopper 15, as shown in FIG. 7. In this instance, the phase coincidence between the ratchet 12a of the cam drive ring 12 and the control pawl 23 is completely negligible. Next, the power supply to the electromagnet 26 is, for once, effected either by means of an operation switch, which is not shown, or by the above cassette loading switch 49. As a result, the armature 27 is operated once. Then, the control pawl 23 engages the ratchet 12a of the cam drive ring 12. The phase thus obtained is considered to be the phase corresponding to the first recording track. By this arrangement, the recording or reproducing head 7 is moved to a position accurately corresponding to the first recording track of the magnetic sheet 5. After that, the recording or reproducing head 7 is moved stepwise in an ordinary recording or reproducing operation, as has been mentioned in the foregoing.

With the embodiment arranged as described above, the phase control of the control cam 11 can be accurately accomplished by the control pawl 23 without requiring any delicate initial phase adjustment mentioned in the foregoing. Furthermore, the ratchet teeth can be formed over the whole outer circumference of the cam drive ring 12 while the phases of the drive pawl 16 and the control pawl 23 can be freely set. This allows greater latitude for manufacture of the apparatus.

In this embodiment, the recording or reproducing head is shifted from the above position to a given recording track position of the magnitude sheet 5 and particularly to the first recording track position in the following manner: When the cassette containing part 45a is loaded with the cassette 48 containing the magnetic sheet 5 therein and then the inner and outer lids 45 and 46 are closed relative to the casing 1, the cassette loading switch 49 is closed. This switch 49 may remain closed when the inner and outer lids 45 and 46 are open and to be opened when these lids 45 and 46 are closed relative to the casing 1. With the cassette loading switch 49 operated in either manner, the electromagnet 26 has the power supplied once thereto. The operation of the apparatus thereafter is performed in the same manner as has been described in the foregoing and the recording or reproducing head 7 is shifted to the first recording track position.

In accordance with the arrangement of this embodiment, the recording or reproducing head 7 is shifted to the first recording track position in response to loading of the cassette 48 containing the recording medium which must always be accomplished in recording or reproduction. The operability of the apparatus thus can be improved by this arrangement.

Figure 8:
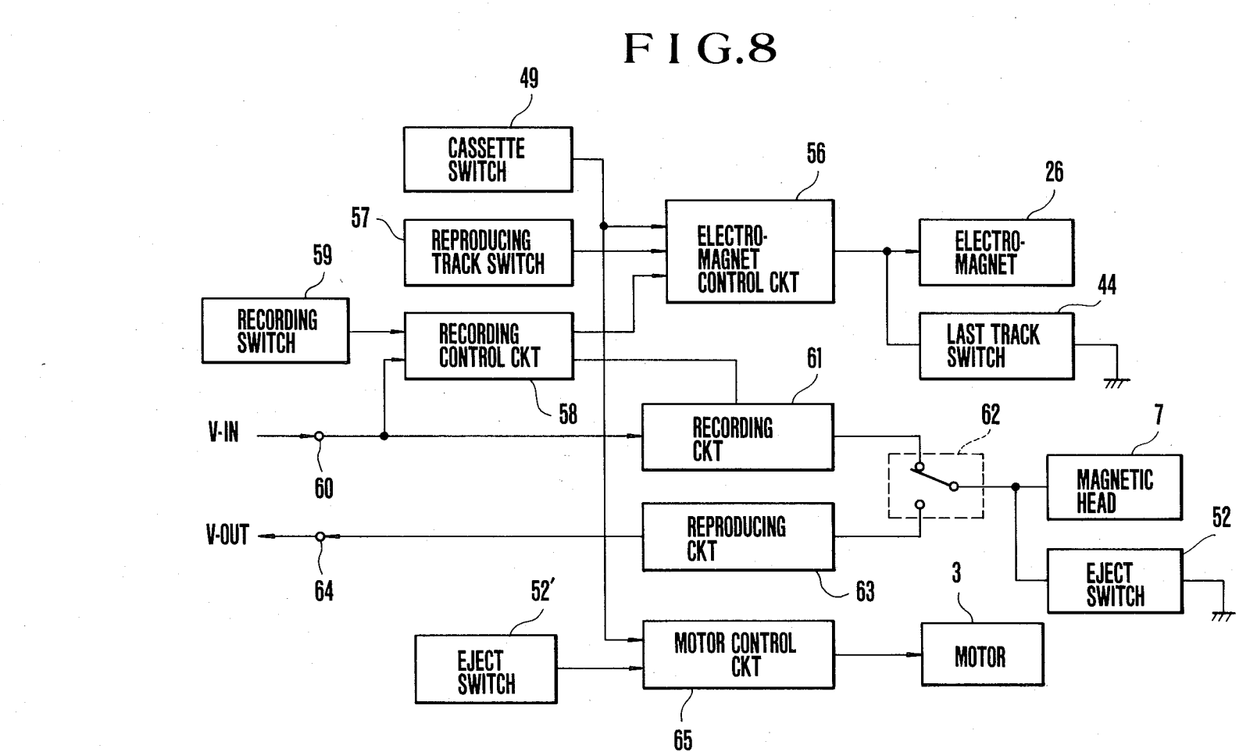
FIG. 8 is a block diagram showing the arrangement of a control system included in the mechanism shown in FIGS. 1 and 2.

The control system of the embodiment is arranged as shown in FIG. 8. The electromagnet 26 is provided with an electromagnet control circuit 56 which excites the electromagnet 26 in response to closing of the cassette loading switch 49. When the electromagnet 26 is excited, the head 7 is shifted from the above initial phase position (or stand-by position) to the first recording track position. The control circuit 56 also excites the electromagnet 26 in response to a reproducing track change-over switch 57, which operates at the time of reproduction of a recorded signal for shifting the head 7 from one track to another. With the electromagnet 26 excited in this manner, the head 7 is shifted to a desired track position. Furthermore, in recording a signal, the control circuit 56 excites the electromagnet 26 in response to a head shifting pulse which is produced from a recording control circuit 58 upon recording completion for one recording track (corresponding, for example, to recording for one field or one frame of television). In that instance, the head 7 is shifted from one track position to the next track position. The recording control circuit 58 controls a recording circuit 61 allowing it to record a signal for one field or one frame in response to a vertical synchronizing signal included in a television signal applied to a recording switch 59 and an input terminal 60. Upon recording completion, the recording control circuit 58 produces the above head shifting pulse. A recording signal from the recording circuit 61 is applied to the head 7 via a change-over switch 62 and is recorded on a given track of the magnetic recording sheet 5. When the above last track switch 44 is closed, the output terminal of the electromagnet control circuit 56 is grounded rendering the electromagnet 26 inoperative. Furthermore, the eject switch 52 is arranged so that, with the switch 52 closed, both ends of the coil of the magnetic head 7 are grounded and are thus rendered incapable of recording or reproducing a signal. A signal reproduced from the magnetic sheet 5 via the head 7 is applied to a reproducing circuit 63 via the switch 62. At the reproducing circuit 63, the signal is subjected to a process required for reproduction before it is reproduced from the circuit 63. The motor 3 is provided with a motor control circuit 65. The motor control circuit 65 actuates the motor 3 in response to closing of the cassette loading switch 49 and also stops the motor in response to closing of a second eject switch 52' which is also responsive to an ejection. Furthermore, this motor control circuit 65 includes a known speed and phase control circuit which has the magnetic sheet 5 rotated at a prescribed rotational frequency, such as 3,600 rpm or 1,800 rpm.

Figure 9:
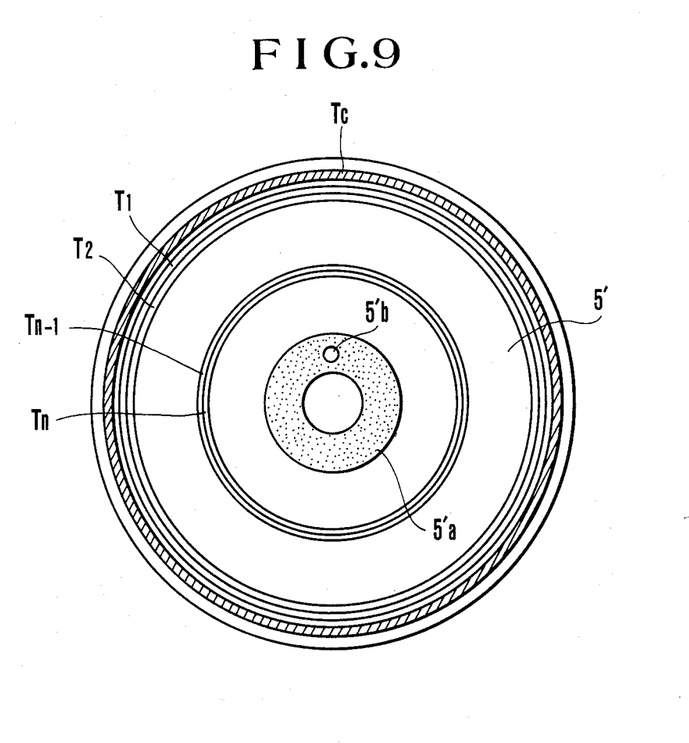
FIG. 9 is a plan view showing, by way of example, a magnetic sheet usable for the recording and/or reproducing apparatus according to the invention.

As has been described in the foregoing, in this embodiment, the head 7 is always reset in a predetermined stand-by position outside of a signal recording or reproducing area on the magnetic sheet 5 at the time that the magnetic sheet cassette 48 is ejected. In this instance, the head 7 can be cleaned by utilizing the stand-by position of the head 7 in the following manner:

FIG. 9 is a plan view showing a magnetic sheet 5' which is provided with a head cleaner to be used on another embodiment of the invention, as viewed on its side, opposed to the recording or reproducing head 7. Referring to FIG. 9, a core portion 5'a of the magnetic sheet 5' is provided with a central hole fitted on the above driving shaft 4. The core portion 5'a is further provided with a rotation phase signal generating part 5'b for detecting the rotating phase of the magnetic sheet 5'. On the magnetic sheet 5' are formed concentric recording track parts T1, T2,—, Tn−1 and Tn which are arranged from the periphery toward the center of the sheet. On the outer side of these track parts T1, T2,—, Tn−1 and Tn is a cleaning track part Tc. The cleaning track part Tc is provided with a very fine lapping material or the like which is secured thereto. The soil or dust on the surface of the recording or reproducing head 7 can be removed by allowing the head 7 and the magnetic sheet 5' to move relative to each other with the head 7 opposed to this cleaning track part Tc.

As has been described in the foregoing, the initial phase of the control cam 11 is determined by abutment of the protruding part 11a on the stopper 15. Therefore, the position of the recording or reproducing head 7 obtained at that instant corresponds to the above cleaning track Tc of the magnetic sheet 5'. The head 7 can be cleaned by allowing the motor 3 to run for a given length of time and by thus allowing the lapping material or the like, which is secured to the cleaning track part Tc, to clean the head 7 under that condition. When the power is next supplied to the electromagnet 26 after the motor 3 has been running under that condition, the cam drive ring 12 turns clockwise through the armature 27 and the drive pawl 16 in the manner described in the foregoing. The phase of the cam drive ring 12 is then determined by the engagement between the drive ring 12 and the control pawl 23. During this phase, the recording or reproducing head 7 is correctly opposed to the first recording track part T1 of the magnetic sheet 5'. Various means are conceivable for operating the motor 3. For example, a switch may be discretely provided solely for the purpose of operating the motor 3. In FIG. 5, the cassette loading switch 49 operates when the cassette 48 containing the magnetic sheet 5 is loaded (the switch 49 may be arranged to either close or open in response to loading of the cassette 48 though it is closed in FIG. 5). In this instance, if the motor 3 rotates in response to the switch action, the recording or reproducing head 7 can be cleaned every time the apparatus is loaded with the cassette 48. Furthermore, if after the motor 3 has rotated over a given length of time the power supply to the electromagnet 26 is automatically controlled, the cleaning and shifting of the head 7 to a position corresponding to the first recording track part T1 can be continuously accomplished. It is also possible to have the cleaning action performed during the process of shifting the head 7 to the position corresponding to the first recording track part T1 by supplying power to the electromagnet 26 during a later period within the above length of time for rotating the motor 3. The width of the cleaning track part Tc is preferably wider toward the first recording track part T1.

Furthermore, it is preferable to make the relative speed of the recording or reproducing head 7 and the magnetic sheet 5' slower for cleaning than for signal recording or reproduction, because: If the relative speed is as high as that of recording or reproduction, there would be developed an air film between the head 7 and the magnetic sheet 5' to hinder removal of soil from the surface of the head 7. In view of this, the relative speed for cleaning is reduced to reduce the thickness of the air film, so that cleaning can be accomplished with the head 7 lightly in touch with the lapping material or the like.

Figure 10A:
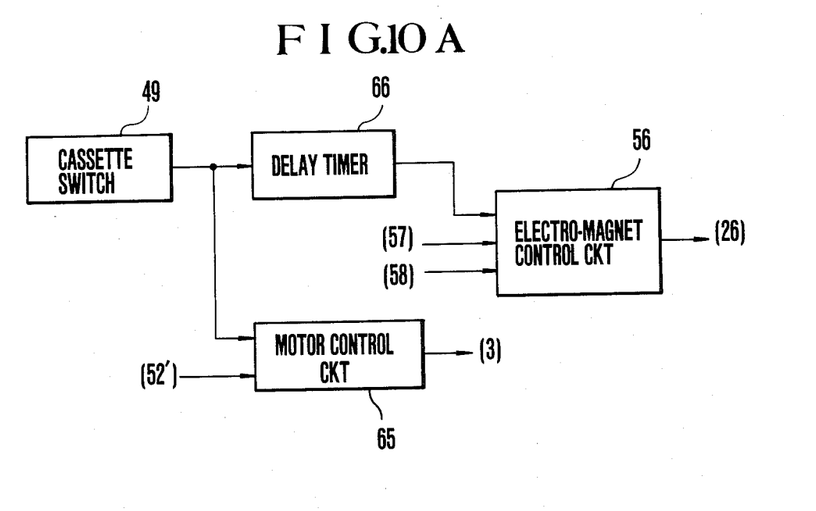
FIGS. 10A and 10B are block diagrams showing the essential parts of two examples of a control system differing from the control system arrangement of FIG. 8.
Figure 10B:
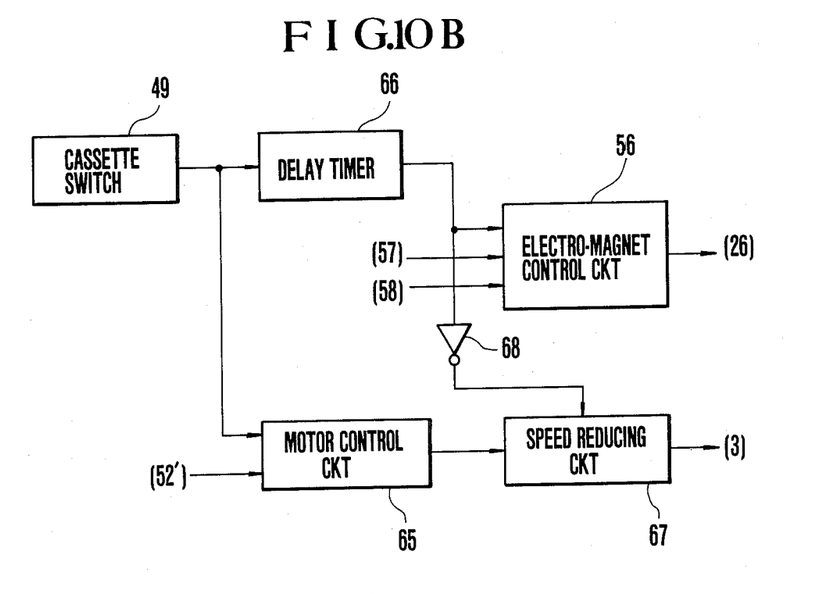

FIGS. 10A and 10B show two variations of the control system used in the embodiment described in the foregoing. In each of the FIGS. 10A and 10B, only the arrangement of the essential parts which differ from the arrangement of FIG. 8 is shown.

In the variation shown in FIG. 10A, a delay timer 66, which gives a prescribed delay time required for the head cleaning process, is interposed between the cassette loading switch 49 and the electromagnetic control circuit 56. As a result of this delay timer 66 being provided, the shift of the head 7 from the reset or stand-by position to the first recording track position occurs after cleaning of the head 7 is completed for a given length of time.

In FIG. 10B, a speed reducing circuit 67 is inserted between the motor control circuit 65 and the motor 3 in addition to the provision of the delay timer 66. The speed reducing circuit 67 is controlled by the output of an inverter 68 which inverts the output of the delay timer 66 in such a manner that the sheet 5' is rotated at a lower speed for cleaning the head 7.

In accordance with the present invention, as has been described above, the recording or reproducing head 7 can be accurately positioned relative to each recording track set on the recording medium without requiring delicate position adjustment. Besides, positioning between the recording or reproducing head 7 and the recording tracks can be accurately accomplished with virtually no adjustment over the full operation range.

In addition to the above advantage, it is an advantage of the arrangement of the embodiment of the invention that the recording or reproducing head can be moved automatically to a position corresponding to a predetermined recording track in response to the recording medium loading operation which is always necessary for operation of the recording and/or reproducing apparatus, so that the operability of the apparatus can be enhanced.

Furthermore, in accordance with the embodiments described with reference to FIGS. 9, 10A and 10B, the recording or reproducing head 7 can be cleaned when the head 7 is returned to a specific position relative to the recording medium. It is particularly preferable, also for confirmation of the address of the recording track to have the recording or reproducing head 7 located in the initial position relative to recording tracks when the apparatus is loaded with the recording medium. Furthermore, in resetting the recording or reproducing head 7, an arrangement bringing the head 7 directly to a given recording track, particularly to a position corresponding to a first recording track, would necessitate fine and delicate adjustment for accurate positioning. The arrangement of the invention to first reset the recording or reproducing head 7 in the specific position mentioned in the foregoing enables the recording or reproducing head 7 to be accurately shifted to a position corresponding to a given recording track without fine adjustment. This arrangement can be advantageously utilized for cleaning the recording or reproducing head 7.

In accordance with the invention, the recording or reproducing head 7 is reset in the above specific position in response to an ejecting operation for taking out or loading the recording medium and the above cleaning means is actuated in response to the recording medium loading operation. with such an arrangement, head 7 resetting and cleaning can be accomplished as a result of an indispensible operation on the apparatus, so that the operability of the apparatus can be further improved.

In the previous embodiment, the recording or reproducing head 7 is fed with the elastic energy of a charged elastic member used as the driving source. However, it goes without saying that, in accordance with the invention, this driving source for feeding the recording or reproducing head 7 may be replaced with some other suitable driving source.

What I claim:

1. A recording and/or reproducing apparatus comprising:
   (A) movable recording and/or reproducing head means;
   (B) positioning means for positioning said head means at a selected one of positions within a predetermined range for recording and/or reproducing;
   (C) reset means for resetting said head means at a predetermined position beyond said predetermined range; and
   (D) shifting means for shifting said head means from said predetermined reset position to a position within said predetermined range in response to an operation for loading the apparatus with a recording medium, said position being determined by said positioning means, wherein said shifting means is arranged to cause said positioning means to position said head means from said reset position to said position within said range in response to the recording medium loading operation, and wherein said shifting means includes detecting means for detecting the loading of said recording medium and for operating said positioning means to position said head means from said reset position to said position within said range in response to the loading of the recording medium, and further includes ejecting means for ejecting said recording medium from the apparatus, said reset means being operatively associated with said ejecting means and resetting said head means at said reset position in response to the ejection of the recording medium by the ejecting means.

2. The apparatus according to claim 1, wherein said positioning means includes:
   moving means for moving said head means; and
   position determining means for determining each of said selected positions for said head means within said range,
   said shifting means being arranged to operate said moving means in response to the recording medium loading operation.

3. The apparatus according to claim 1, further comprising:
   cleaning means for cleaning said head means at said predetermined reset position.

4. The apparatus according to claim 3, wherein said cleaning means includes:

a cleaning member disposed at a position substantially corresponding to said reset position of said head means; and a driving member for moving said cleaning member at said position relative to said head means.

5. The apparatus according to claim 4, wherein said cleaning member is disposed on a portion of said recording medium at a position substantially corresponding to said reset position of said head means.

6. The apparatus according to claim 5, further comprising:

control means for operating said driving member in response to the loading of said recording medium having said cleaning member.

7. The apparatus according to claim 6, wherein said control means is arranged to shift said head means from said predetermined reset position to a position within said predetermined range after the lapse of a predetermined period of time from the begining of the cleaning of said head means, said position within said range being determined by said positioning means.

8. The apparatus according to claim 7, wherein said control means is arranged to cause said positioning means to position said head means from said reset position to said position within said range after the lapse of said predetermined period of time.

9. The apparatus according to claim 8, wherein said control means includes;

a detecting switch for detecting the loading of said recording medium having said cleaning member;

a first control circuit responsive to said detecting switch for operating said driving member; and a second control circuit responsive to said detecting switch for causing said positioning means to position said head means at said position within said range after the lapse of said predetermined period of time.

10. The apparatus according to claim 9, wherein said positioning means includes;

moving means for moving said head means; and position determining means for determining each of said selected positions for said head means within said predetermined range;

said second control circuit being arranged to operate said moving means after the lapse of said predetermined period of time.

11. The apparatus according to claim 5, further comprising:

ejecting means for ejecting said recording medium from the apparatus;

said reset means being operatively associated with said ejecting means and resetting said head means at said reset position in response to the ejection of the recording medium by the ejecting medium.

12. A signal recording and/or reproducing apparatus using a recording medium comprising:

(A) movable head means for recording signals on the recording medium and/or reproducing signals from the medium;

(B) positioning means for positioning said head means at a selected one of positions within a predetermined range;

(C) reset means for resetting said head means at a predetermined position beyond said predetermined range; and (D) means for preventing said recording medium from being recorded and/or reproduced by said head means at said predetermined reset position of the head means, wherein said preventing means includes shifting means for shifting said head means from said predetermined reset position to a position within said predetermined range in response to an operation for loading the apparatus with the recording medium, said position being determined by said positioning means, wherein said shifting means is arranged to cause said positioning means to position said head means from said reset position to said position in response to the recording medium loading operation, and wherein said shifting means includes detecting means for detecting the loading of said recording medium and for operating said positioning means to position said head means from said reset position to said position within said range in response to the loading of the recording medium.

13. The apparatus according to claim 12, wherein said positioning means includes:

moving means for moving said head means; and position determining means for determining each of said selected positions for said head means within said range, said shifting means being arranged to operate said moving means in response to the recording medium loading operation.

14. The apparatus according to claim 12, wherein said preventing means further includes:

ejecting means operatively coupled to said reset means for ejecting the recording medium from the apparatus when said head means is reset at said reset position by the reset means.

15. A sheet recording and/or reproducing apparatus using a disc shaped magnetic sheet comprising:

(A) a movable magnetic head for recording signals on the magnetic sheet and/or reproducing signals from the sheet;

(B) a movable cam for controlling the position of said head relative to the magnetic sheet;

(C) a ratchet mechanism for positioning said cam at a selected one of positions within a predetermined range for signal recording and/or reproducing for the head;

(D) a reset mechanism for resetting said cam at a predetermined position beyond said predetermined range; and (E) control means for operating said ratchet mechanism to position said cam from said reset position to a position within said range in response to the loading of said magnetic sheet to the apparatus, and wherein said control means includes a detecting member for detecting that the magnetic sheet is loaded at a predetermined position for signal recording and/or reproducing in the apparatus.

16. The apparatus according to claim 15, wherein said magnetic sheet has a head cleaning member disposed on a predetermined portion thereof, said portion corresponding to a position of said head which is determined by the reset position of said cam, and the apparatus further comprises:

a driving member for rotating said magnetic sheet relative to said head.

17. The apparatus according to claim 16, wherein said control means is arranged to operate said driving member in response to the loading of said magnetic sheet to the apparatus.

18. The apparatus according to claim 15, wherein said control means includes:

a first control circuit responsive to said detecting member for operating said driving member; and a second control circuit responsive to said detecting member for operating said ratchet mechanism to position said cam at said position within said range after the lapse of said predetermined period of time.

19. The apparatus according to claim 15, further comprising:

an ejecting mechanism for ejecting said magnetic sheet from a predetermined position for signal recording and/or reproducing within the apparatus;

said reset mechanism being operatively coupled to said ejecting mechanism and resetting said cam at said reset position in response to the ejection of the magnetic sheet by the ejecting mechanism.

* * * * *